United States Patent [19]

Harakawa et al.

[11] Patent Number: 4,929,316
[45] Date of Patent: May 29, 1990

[54] METHOD OF MANUFACTURING ORGANIC SEMI-CONDUCTOR SOLID ELECTROLYTIC CAPACITOR

[75] Inventors: Yoshihiro Harakawa; Seiya Takahashi; Koji Izawa; Hidemitsu Takeuchi; Keizo Ikari, all of Kawasaki, Japan

[73] Assignee: Niksuko Corporation, Kanagawa, Japan

[21] Appl. No.: 400,906

[22] Filed: Aug. 30, 1989

[30] Foreign Application Priority Data

Sep. 2, 1988 [JP] Japan ................................. 63-219667

[51] Int. Cl.$^5$ ............................................... C25D 9/02
[52] U.S. Cl. ................................................... 204/56.1
[58] Field of Search ............................... 204/14.1, 56.1

[56] References Cited

FOREIGN PATENT DOCUMENTS

3419552A1  11/1985  Fed. Rep. of Germany .
56-36124    4/1981  Japan .
60-244017  12/1985  Japan .
61-2315     1/1986  Japan .
62-189714   8/1987  Japan .
2026773     2/1980  United Kingdom .

*Primary Examiner*—T. M. Tufariello
*Attorney, Agent, or Firm*—Armstrong, Nikaido, Marmelstein, Kubovcik & Murray

[57] ABSTRACT

A method of manufacturing an organic semi-conductor solid electrolytic capacitor wherein a conductive polymer thin film layer of a heterocyclic compound, i.e., pyrrole, thiophene or furan, is formed as a solid electrolyte on the surface of a metal substrate having a dielectric oxide film formed thereon by electrolytic oxidation polymerization carried out in an electrolytic solution which contains pyrrole, thiophene or furan as a heterocyclic compound and an aliphatic or aromatic sulfonic acid or a salt thereof as a supporting electrolyte in an organic solvent, for example, acetonitrile, acetone or propylene carbonate.

10 Claims, 2 Drawing Sheets

METHOD OF MANUFACTURING ORGANIC SEMI-CONDUCTOR SOLID ELECTROLYTIC CAPACITOR

BACKGROUND OF THE INVENTION

The present invention relates to a method of manufacturing an organic semi-conductor solid electrolytic capacitor in which a conductive polymer thin film layer of a heterocyclic compound is used as an electrolyte. More particularly, the present invention relates to a method of manufacturing an organic semi-conductor solid electrolytic capacitor which is characterized by the process for forming a conductive polymer thin film layer of a heterocyclic compound.

Conventionally, solid electrolytic capacitors use manganese dioxide ($MnO_2$) or tetracyanoquinodimethane as a solid electrolyte. The conventional capacitors that use manganese dioxide ($MnO_2$) or tetracyanoquinodimethane as a solid electrolyte are disadvantageous in that they involve very complicated and costly manufacturing processes, the specific resistance or ESR of the capacitors is high and there is a large leakage current.

Accordingly, in order to improve upon the aforementioned problems relating to these manufacturing processes and capacitor characteristics, a novel solid electrolytic capacitor has been proposed in which a polymer layer of a heterocyclic compound is used as the solid electrolyte For example, see the specifications of Japanese Patent Application Laid-Open Publication (KOKAI) Nos. 60-244017 and 61-2315 and Japanese Patent Application Number 62-86584.

In a solid electrolytic capacitor of this type, a polymer layer of a heterocyclic compound that is formed on the surface of a metal substrate having a dielectric oxide film formed thereon is used as a solid electrolyte. The polymer layer of a heterocyclic compound is formed by preparing an electrolytic solution which contains a heterocyclic compound, for example, pyrrole, and a boron compound, for example, ammonium borodisalicylate (ABS), as a supporting electrolyte in an organic solvent, for example, acetonitrile, dipping a metal substrate having a dielectric oxide film formed thereon into the electrolytic solution, and supplying a predetermined direct current using the metal substrate as an anode and the electrolytic solution as a cathode, thereby carrying out electrolytic oxidation polymerization, and thus forming a polymer thin film of a heterocyclic compound, for example, pyrrole, on the dielectric oxide film provided on the metal substrate.

Thus, the conventional polymer layer of a heterocyclic compound is formed by electrolytic oxidation polymerization carried out in an electrolytic solution which contains a heterocyclic compound and a boron compound as a supporting electrolyte in an organic solvent. However, if it is possible to form a high-quality polymer layer of a heterocyclic compound by use of not only the aforementioned electrolytic solution but also other electrolytic solutions, particularly one in which a compound other than a boron compound is employed as a supporting electrolyte, then the process for forming a polymer layer of a heterocyclic compound will be diversified and it will become possible to manufacture solid electrolytic capacitors having excellent capacitor characteristics even more efficiently. However, there has heretofore been no proper electrolytic solution other than the aforementioned one in which a boron compound is used as a supporting electrolyte.

SUMMARY OF THE INVENTION

The present invention has been devised in view of the foregoing circumstances and its object is to provide a method of manufacturing an organic semi-conductor solid electrolytic capacitor wherein a polymer layer of heterocyclic compound is formed by electrolytic oxidation polymerization in an electrolytic solution which contains a compound other than a boron compound as a supporting electrolyte.

To this end, the present invention provides a method of manufacturing an organic semi-conductor solid electrolytic capacitor comprising at least the following means: means for forming a dielectric oxide film on the surface of a metal substrate; and means for forming a conductive polymer thin film layer of a heterocyclic compound on the dielectric oxide film by electrolytic oxidation polymerization carried out in an electrolytic solution which contains pyrrole, thiophene or furan as a heterocyclic compound and an aliphatic or aromatic sulfonic acid or a salt thereof as a supporting electrolyte in an organic solvent, for example, acetonitrile, acetone or propylene carbonate.

DESCRIPTION OF THE PREFERRED EMBODIMENT

Figure 1:
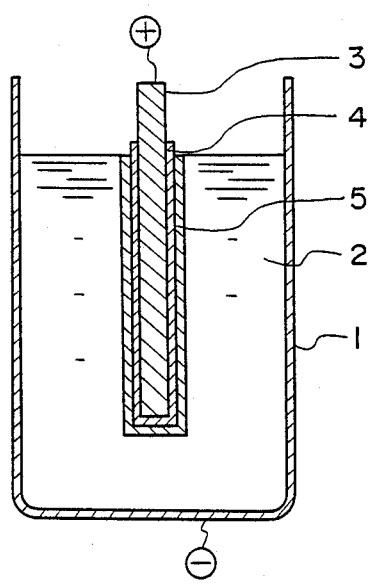
FIG. 1 is a view showing the method of manufacturing an organic semi-conductor solid electrolytic capacitor according to the present invention.

FIG. 1 is a view showing the method of manufacturing an organic semi-conductor solid electrolytic capacitor according to the present invention. Referring to the figure, the reference numeral 1 denotes a stainless steel vessel 1 which contains an electrolytic solution 2 prepared by dissolving a heterocyclic compound, for example, pyrrole, thiophene or furan, and an aliphatic or aromatic sulfonic acid or a salt thereof as a supporting electrolyte in an organic solvent, for example, acetonitrile, acetone or propylene carbonate. The reference numeral 3 denotes a metal substrate capable of having a dielectric oxide film formed thereon, for example, aluminum, tantalum or titanium. The metal substrate 3 has a dielectric oxide film 4 (e.g., an aluminum oxide film in the case where aluminum is employed as a metal substrate 3) formed on the surface thereof. The metal substrate 3 having the dielectric oxide film 4 formed on the surface thereof is dipped into the electrolytic solution 2 and a predetermined direct current is supplied using the metal substrate 3 as an anode and the stainless steel vessel 1 as a cathode, thereby forming a conductive polymer thin film layer 5 of a heterocyclic compound on the surface of the dielectric oxide film 4.

Examples of aliphatic or aromatic sulfonic acids which are usable as a supporting electrolyte are as follows:

ALIPHATIC SULFONIC ACIDS (1) $H(CH_2)_4SO_3 \cdot N(C_2H_5)_4$: tetraethyl-ammonium butanesulfonate (2) $H(CH_2)_8SO_3 \cdot N(C_2H_5)_4$: tetraethyl-ammonium octanesulfonate (3) $H(CH_2)_{10}SO_3 \cdot N(C_2H_5)_4$: tetraethyl-ammonium decanesulfonate (4) $H(CH_2)_{12}SO_3 \cdot N(C_2H_5)_4$: tetraethyl-ammonium dodecylsulfonate

Figure 2:
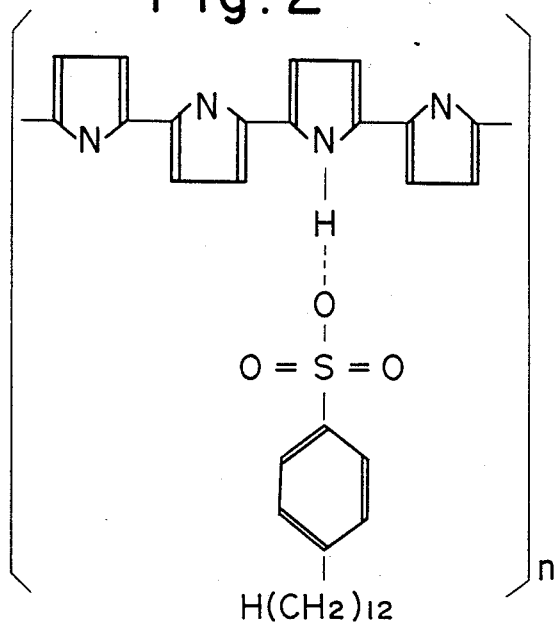
FIG. 2 is a view showing the chemical structure of a conductive polymer of pyrrole.

AROMATIC SULFONIC ACIDS (1) $C_6H_5 \cdot SO_3$: benzenesulfonic acid (2) $CH_3 \cdot C_6H_4 \cdot SO_3 \cdot N(C_2H_5)_4$: tetraethyl-ammonium p-toluenesulfonate (3) $H(CH_2)_{12} \cdot C_6H_4 \cdot SO_3 \cdot H$: dodecylbenzenesulfonic acid For example, an electrolytic solution 2 which consists essentially of 98.6 wt% (per cent by weight) an organic solvent, 0.7 wt% a supporting electrolyte selected from those mentioned above and 0.7 wt% pyrrole as being a heterocyclic compound is put in the stainless steel vessel 1. An aluminum plate serving as a metal substrate 3 which has an aluminum oxide film formed on the surface thereof is dipped into the electrolytic solution 2, and a predetermined direct current is passed across the aluminum plate used as an anode and the stainless steel vessel 1 used as a cathode to perform electrolytic oxidation polymerization in the electrolytic solution 2, thereby forming a conductive polymer layer of pyrrole represented by the structural formula (estimated) shown in FIG. 2 on the aluminum oxide film provided on the aluminum plate to a thickness of from 20 μm to 50 μm as being the conductive polymer thin film 5 of a heterocyclic compound. The measured value of the specific resistance of the conductive polymer thin film of pyrrole is 0.1 to 1Ωcm. In the case of a conventional solid electrolytic capacitor using manganese dioxide as an electrolyte, the measured value of the specific resistance of manganese dioxide is 1 to 100Ωcm. Therefore, the specific resistance of the conductive polymer thin film of pyrrole is extremely low in comparison with that of manganese dioxide and it is possible to expect that a solid electrolytic capacitor which uses such a polymer thin film as an electrolyte will exhibit considerably excellent impedance characteristics.

Figure 3:
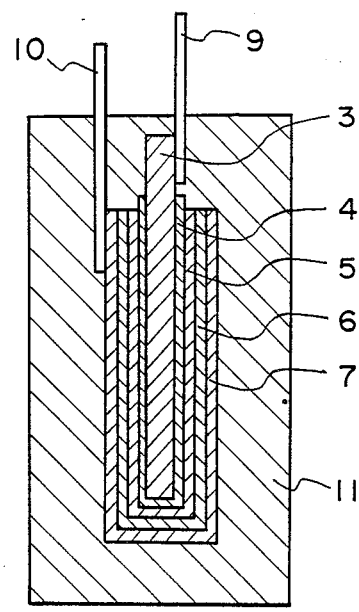
FIG. 3 is a sectional view illustrating the structure of an organic semi-conductor solid electrolytic capacitor produced by the manufacturing method according to the present invention.

After the conductive polymer thin film 5 of a heterocyclic compound has been formed on the dielectric oxide film 4 provided on the metal substrate 3 in the way described above, a conductive layer for electrode extraction is formed on the conductive polymer thin film 5, the conductive layer including a graphite layer 6 and a silver paste layer 7 which are formed successively, as shown in FIG. 3. Electrode terminals 9 and 10 are attached to the metal substrate 3 and the silver paste layer 7, respectively, and a predetermined armor 11 is provided thereon, thus completing an organic semi-conductor solid electrolytic capacitor according to the method of the present invention.

Figure 4:
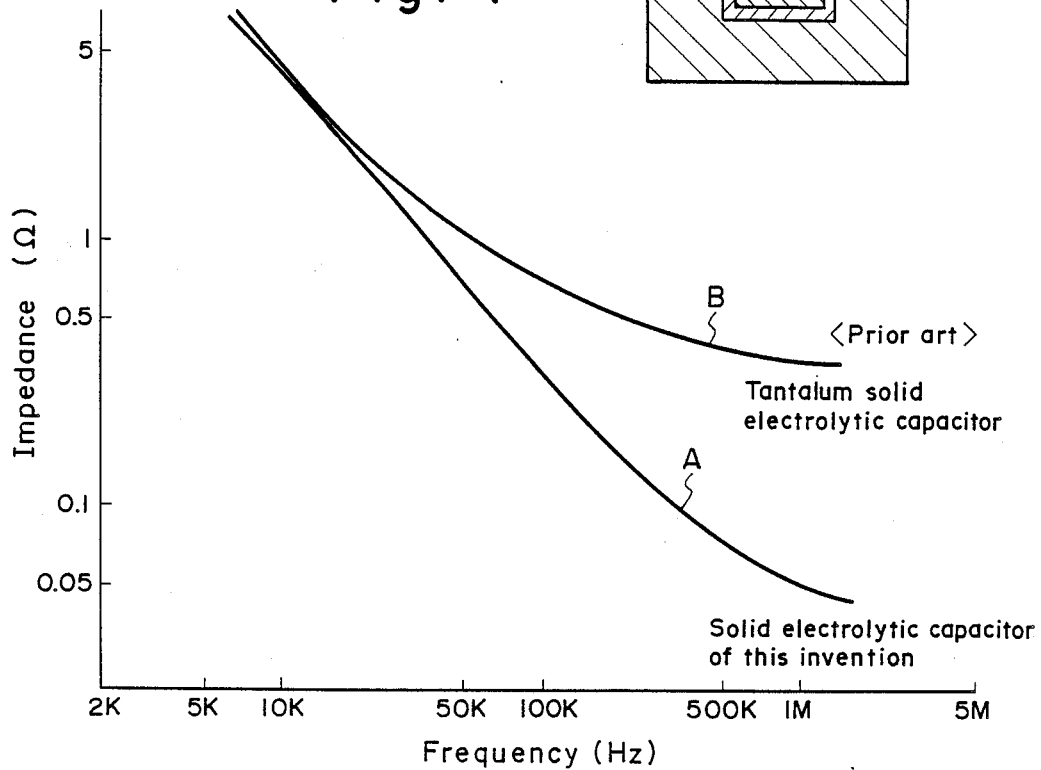
FIG. 4 is a view showing the impedance characteristics of an organic semi-conductor solid electrolytic capacitor produced by the manufacturing method according to the present invention and a conventional tantalum solid electrolytic capacitor.

FIG. 4 is a view showing the impedance characteristics of a conventional tantalum solid electrolytic capacitor using manganese dioxide as an electrolyte (the curve B) and an organic semi conductor solid electrolytic capacitor according to the present invention which uses the above-described conductive polymer thin film layer of pyrrole as an electrolyte (the curve A). As shown by the curve A in the figure, the organic semi-conductor solid electrolytic capacitor of the present invention has an extremely small impedance in comparison with the conventional tantalum solid electrolytic capacitor shown by the curve B.

As has been described above, according to the present invention, a conductive polymer thin film layer of a heterocyclic compound is formed by electrolytic oxidation polymerization in an electrolytic solution which contins an aliphatic or aromatic sulfonic acid or a salt thereof as a supporting electrolyte, thereby obtaining an organic semi-conductor solid electrolytic capacitor in which the specific resistance of the conductive polymer thin film is smaller than that of manganese dioxide and which has, therefore, excellent impedance characteristics.

Although the present invention has been described through specific terms, it should be noted here that the described embodiment is not necessarily exclusive and that various changes and modifications may be imparted thereto without departing from the scope of the invention which is limited solely by the appended claims.

What we claim is:

1. A method of manufacturing an organic semi-conductor solid electrolytic capacitor comprising at least the following means:
    means for forming a dielectric oxide film on the surface of a metal substrate; and
    means for forming a conductive polymer thin film layer of a heterocyclic compound on the surface of said dielectric oxide film by electrolytic oxidation polymerization carried out in an electrolytic solution which contains a heterocyclic compound and an aliphatic or aromatic sulfonic acid or a salt thereof as a supporting electrolyte in an organic solvent.

2. A method of manufacturing an organic semi-conductor solid electrolytic capacitor according to claim 1, wherein said organic solvent is one selected from the group consisting of acetonitrile, acetone and propylene carbonate.

3. A method of manufacturing an organic semi-conductor solid electrolytic capacitor according to claim 1, wherein said heterocyclic compound is one selected from the group consisting of pyrrole, thiophene and furan.

4. A method of manufacturing an organic semi-conductor solid electrolytic capacitor according to any of claims 1 to 3, wherein said aliphatic sulfonic acid is tetraethyl-ammonium butanesulfonate.

5. A method of manufacturing an organic semi-conductor solid electrolytic capacitor according to any of claims 1 to 3, wherein said aliphatic sulfonic acid is tetraethyl-ammonium octanesulfonate.

6. A method of manufacturing an organic semi-conductor solid electrolytic capacitor according to any of claims 1 to 3, wherein said aliphatic sulfonic acid is tetraethyl-ammonium decanesulfonate.

7. A method of manufacturing an organic semi-conductor solid electrolytic capacitor according to any of claims 1 to 3, wherein said aliphatic sulfonic acid is tetraethyl-ammonium dodecylsulfonate.

8. A method of manufacturing an organic semi-conductor solid electrolytic capacitor according to any of claims 1 to 3, wherein said aromatic sulfonic acid is benzenesulfonic acid.

9. A method of manufacturing an organic semi-conductor solid electrolytic capacitor according to any of claims 1 to 3, wherein said aromatic sulfonic acid is tetraethyl-ammonium p-toluenesulfonate.

10. A method of manufacturing an organic semi-conductor solid electrolytic capacitor according to any of claims 1 to 3, wherein said aromatic sulfonic acid is dodecylbenzene-sulfonic acid.

* * * * *